United States Patent [19]

Grindle

[11] Patent Number: 4,704,665

[45] Date of Patent: Nov. 3, 1987

[54] CORROSION RESISTANT ELECTRIC LUMINAIRE HAVING RIGID INTERNAL SUPPORT STRUCTURE

[75] Inventor: James L. Grindle, Hendersonville, N.C.

[73] Assignee: General Electric Company, Schenectady, N.Y.

[21] Appl. No.: 855,522

[22] Filed: Apr. 24, 1986

[51] Int. Cl.[4] .......................... F21V 29/00; B60Q 1/00

[52] U.S. Cl. .................................... 362/267; 362/368; 362/375

[58] Field of Search ............... 362/368, 267, 431, 382, 362/145, 426, 310, 430

[56] References Cited

U.S. PATENT DOCUMENTS

| | | | |
|---|---|---|---|
| 2,094,394 | 9/1937 | Bisscll | 362/267 |
| 2,261,695 | 11/1941 | Norlich et al. | 362/267 |
| 2,574,882 | 11/1951 | McDowell et al. | 362/367 |
| 2,652,482 | 9/1953 | Bisscll | 362/267 |
| 2,770,715 | 11/1956 | Steebor | 362/267 |
| 2,813,970 | 11/1957 | Lester | 362/267 |
| 3,328,573 | 6/1967 | Nava et al. | 362/267 |
| 4,173,037 | 10/1979 | Henderson, Jr. et al. | 362/368 |
| 4,379,321 | 4/1983 | Plemmons et al. | 362/267 |
| 4,388,680 | 6/1983 | Moore | 362/375 |
| 4,425,609 | 1/1984 | Grindle | 362/267 |

*Primary Examiner*—Raymond A. Nelli
*Attorney, Agent, or Firm*—John P. McMahon; Philip L. Schlamp; H. J. Policinski

[57] ABSTRACT

An electric luminaire is provided having an interior comprised of weather and corrosion resistant housing of non-metallic material, such as plastic. The housing defines an internal cavity, in which the electrical components of the luminaire reside, entirely sealed against intrusion of corrosive elements present in the atmosphere of the external environment. A rigid unitary metallic support structure, carried by a mounting hub adapted to be attached to an external support, extends from the mounting hub through the cavity and to the optical components at the lower end of the luminaire. The rigid support structure provides both primary and supplemental, or back-up, support for the electrical and optical components of the luminaire.

14 Claims, 6 Drawing Figures

Fig. 4
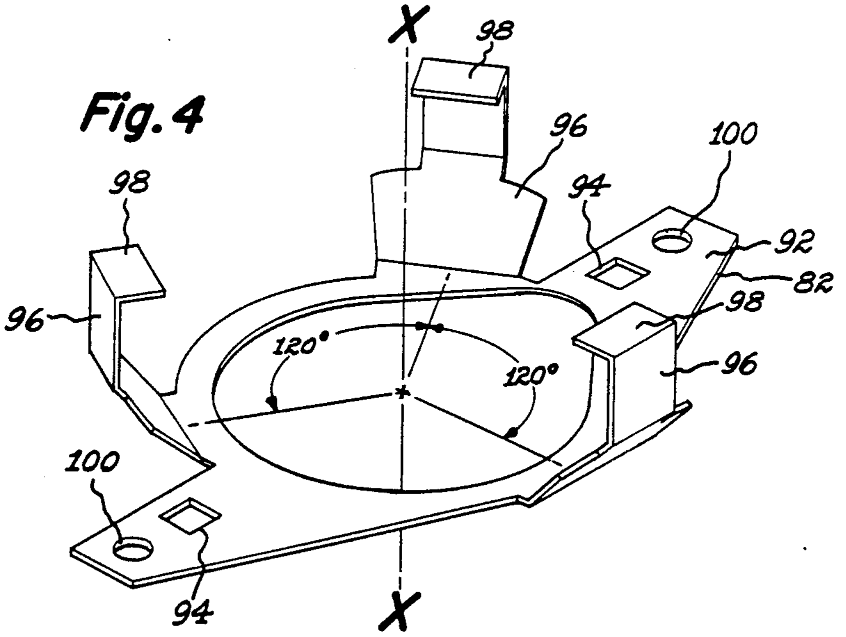
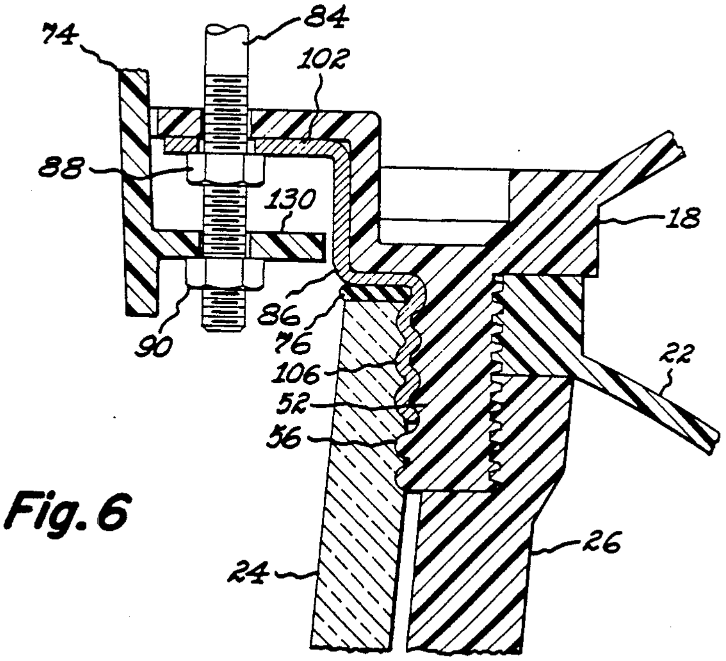
Fig. 6

CORROSION RESISTANT ELECTRIC LUMINAIRE HAVING RIGID INTERNAL SUPPORT STRUCTURE

FIELD OF THE INVENTION

This invention relates to electric luminaires and more particularly to electric luminaires the interior surfaces of which are entirely comprised of non-metallic materials, such as plastic and glass, and the heavy electrical and optical components of which are supported by a unitary rigid metallic support structure.

BACKGROUND OF THE INVENTION

Luminaires are often placed in service in industrial applications which subject the luminaire to severe weathering conditions or extremely corrosive atmospheres. Conventionally, luminaires exposed to such conditions have been comprised of housings fabricated of die-cast aluminum, steel, brass or stainless steel. However, even these materials, when used in some extremely corrosive applications are not entirely satisfactory and, accordingly, the life of the luminaire is limited. While various paints or epoxy coatings have been tried in an effort to extend the life of the luminaire, these attempts have also proven to be less than entirely satisfactory.

While substitutions of other materials, such as plastic, for the metallic materials conventionally used in the external housing of heavy-duty luminaires, can provide suitable resistance to corrosive atmospheres, the shift to plastics has been slow because of the necessity of utilizing a housing material capable of supporting the heavy electrical and optical components of the luminaire. Since these components have usually been mounted to and supported by the luminaire housing, the use of more economical but weaker materials has not been widely adopted. Moreover, regulations of organizations such as Underwriters Laboratories recognize the limited stress bearing capabilities of non-metallic housings and prescribe various safety measures which must be employed when heavy electrical or optical components are mounted on and supported by a non-metallic housing. These measures add cost to the luminaire.

Various attempts have been used to employ plastic housings in heavy duty luminaires. For example, U.S. Pat. No. 4,388,680 describes a luminaire having a plastic outer housing and an inner base plate which carries the load of some of the heavy electrical components. However, the structure described in this patent nonetheless still relies on the plastic housing to carry the load of the luminaire lamp and socket assembly and the load of the refractor assembly. Should the plastic housing fail during the life of the luminaire nothing described in this patent provides for retention of these components to the luminaire. Accordingly, it is possible for these components to fall from the luminaire upon failure of the plastic housing. This possibility exists because the luminaire fails to provide for either mounting of the refractor assembly and the lamp and socket assembly on a metallic portion of the luminaire or for back-up or supplemental means of supporting these assemblies.

It is also observed that the structure described in the aforementioned patent retains the two plastic housing members in mating engagement with each other by the use of a hinge and latch each located exterior to the housing members. Thus, the hinge and latch are exposed to corrosive atmospheres that might be present in the environment. Should extensive corrosion occur, the latch or hinge may fail resulting in separation of the housing members.

Another device known in the prior art to utilize plastic outer housings is as described in U.S. Pat. No. 4,379,321. However, like the structure described in the patent previously mentioned, the luminaire plastic housing carries the load of both the refractor and lamp and socket assemblies and retains the housing members in mating engagement by a hinge and latch (screws)disposed external to the housing.

Where component assemblies of a luminaire are of a weight in excess of Underwriter Laboratories limits, various supplemental, or back-up, support means must be employed for safety purposes. One such safety means employed in the past is the provision of a loose chain or cable which is separate from but connected to a metallic portion of the support structure of the luminaire and which captures those components having the aforementioned excess weight. Thus, if the plastic housing should have a stress-induced or other failure, the separate safety chain or cable prevents the luminaire from falling. However, the use of a separate loose chain or cable introduces additional cost and can produce a hazard if the separate loose chain were to contact current conducting components within the luminaire.

SUMMARY OF THE INVENTION

Accordingly, it is an object of the present invention to provide a luminaire wherein the entire external surface of the luminaire is well-adopted to withstand corrosive elements of the environment.

It is another object of the present invention to provide a luminaire wherein a rigid unitary metallic support structure captures the electrical and optical components of the luminaire and to thereby provide supplemental, or back-up, support for the electrical and optical components at a minimum of additional costs and without introducing hazards in the operation of the luminaire.

It is yet another object of the present invention to provide a luminaire wherein the rigid unitary metallic support structure also serves to provide primary support for one or more of the electrical and optical assemblies of the luminaire.

It is still another object of the present invention to provide a luminaire wherein the non-metallic housing members are retained in mating engagement by means sealed from the corrosive elements in the atmosphere.

It is still yet another object of the present invention to provide a luminaire wherein the rigid metallic support structure retains the housing members in mating engagement.

Briefly stated, these and other objects of the present invention, which will become apparent from the following detailed description and accompanying drawings, are accomplished by the present invention which, in one form, provides a luminaire having a metallic mounting hub portion adapted to be secured to an external support whereby the entire weight of the luminaire is transmitted through the mounting hub portion to the external support. The luminaire further comprises a hollow external housing defining a cavity therewithin and comprised of a non-metallic material having good resistance to weathering or corrosion. The external mounting hub provides support for the non-metallic housing. A ballast assembly resides in the cavity and is fixedly secured against movement with respect to the mounting hub portion while a socket and lamp assembly, also secured against movement with respect to the mounting hub portion, extends from one side of the cavity. A rigid unitary metallic support portion is provided which is carried by the mounting hub portion and extends therefrom through the cavity to the socket and lamp assembly. The metallic support portion captures each of the ballast and socket and lamp assemblies and may provide at least supplemental retention of one of the these assemblies. The support portion may also provide primary support at least one of the aforementioned assemblies. Furthermore, where the housing is comprised of first and second housing members, the rigid metallic support portion may provide for retention of the first and second housing members in abutting engagement with each other. It is readily observed that, in one form, the invention provides a single unitary support portion which captures each of the aforementioned assemblies and which provides for either primary or supplemental support for the captured assemblies. The rigid support structure is sealed from corrosive elements in the atmosphere of the environment and further provides for retaining the housing members in abutting engagement.

DESCRIPTION OF THE DRAWINGS

While the specification concludes with claims distinctly claiming and particularly pointing out the invention described herein, the invention is more readily understood by reference to the following description and the accompanying drawings in which:

FIG. 4 is a perspective view of the plate depicted in FIG. 3.

FIG. 6 is an enlarged view of a portion of the luminaire depicted in FIG. 2.

DESCRIPTION OF THE PREFERRED EMBODIMENT

Figure 1:
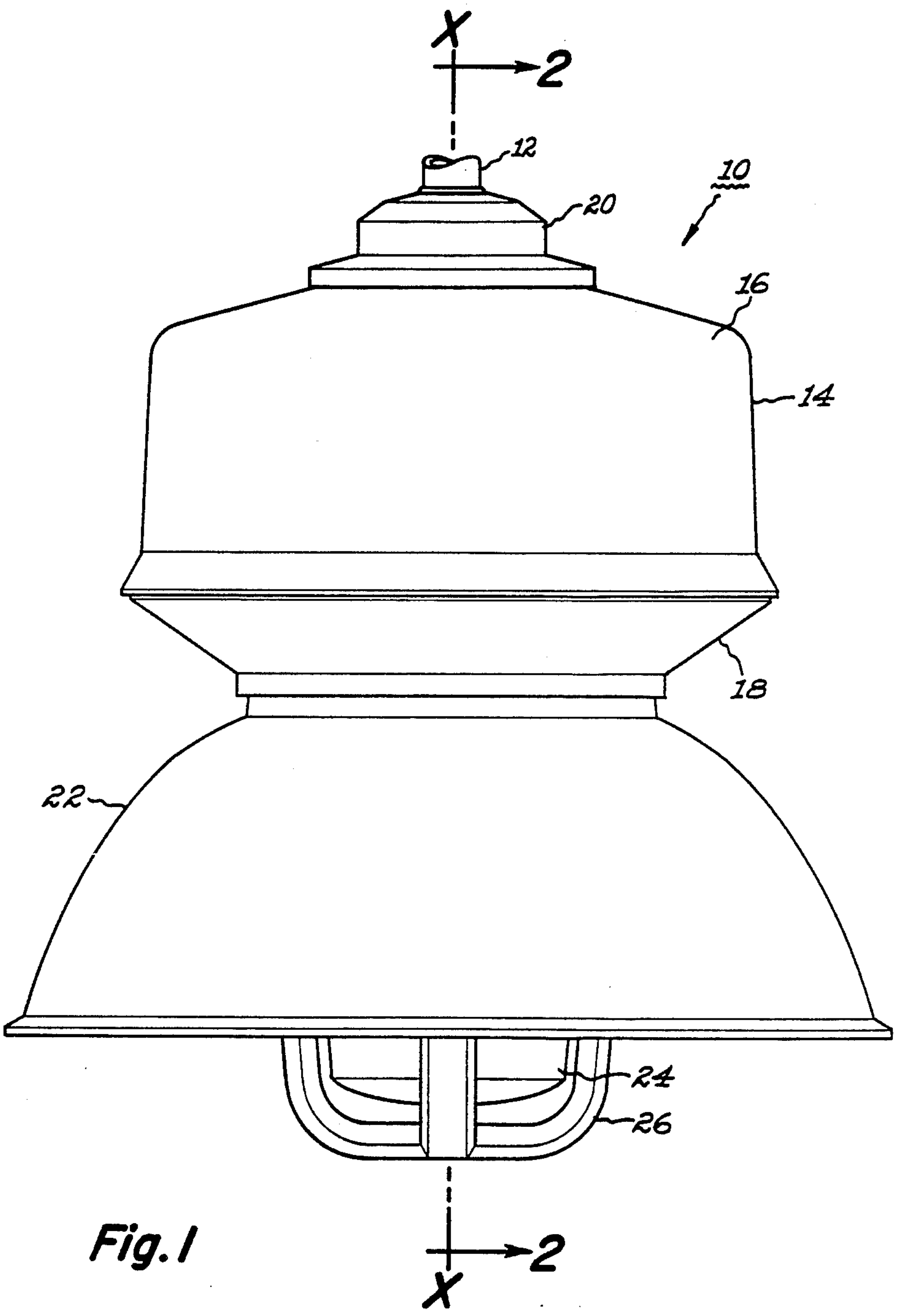
FIG. 1 depicts a side view of the luminaire comprising the present invention.

Before referring to the drawings, it is advantageous, for purposes of facilitating an understanding of the invention, to define certain terms hereinafter employed to describe the following embodiment. In this regard, a key feature of the present invention resides in a unitary metallic support structure which captures each of certain enumerated heavy electrical and optical components of the luminaire. As used herein the word "capture", with respect to the relationship between the unitary support structure and another component of the luminaire, means that the component is connected to the unitary support structure in a manner which prevents the component from separating completely from the luminaire in the event of a failure of the non-metallic housings. The unitary support structure captures each enumerated component to provide either primary or supplementary (back-up) for each of the heavy electrical or optical components. The term "primary support" is used herein to describe the support provided by the rigid metallic support structure to a component which is directly mounted to or carried by the rigid metallic support structure. The term "supplemental support" is used herein to describe the back-up or secondary support which the rigid metallic support structure provides to a component which is mounted directly to the non-metallic housing members of the luminaire. The purpose for providing back-up or supplemental support is to ensure that, in the event the non-metallic housing failed due to stress or heat, the component mounted to the non-metallic housing would still be retained by the metallic support structure. Finally, the word "unitary" as used herein describes a metallic support structure wherein all of the components providing supplemental or primary support cooperate to form a continuous support structure wherein all of the loads are transmitted through a path comprised entirely of metal.

Referring now to FIG. 1, a side view of a luminaire comprising the present invention is shown generally at 10 mounted to, and extending vertically from, an external support in the form of electrical conduit 12. Luminaire 10 is comprised of a generally cylindrical configuration disposed about an axis x—x and is fabricated to provide an external surface comprised entirely of non-metallic material. More specifically, luminaire 10 includes a non-metallic hollow housing 14 comprised of first and second non-metallic housing members 16 and 18 which house the electrical components of the luminaire. Disposed at the upper end of luminaire 10, an end cap 20 abuts first housing member 16 and, in a manner hereinafter to be described, seals the interface between luminaire 10 and conduit 12 to thereby prevent intrusion of corrosive elements in the atmosphere of the environment into the interior of the luminaire. Luminaire 10 further includes a generally cylindrical non-metallic globe or refractor 24 and may further include a non-metallic dish-shaped reflector 22, and a non-metallic refractor guard 26. Refractor 24, reflector 22 and guard 26 may each be mounted to the second housing member 18 at the lower end of luminaire 10 as will be more fully described.

It is readily observed that luminaire 10 does not have any metallic parts or components exposed to the external atmosphere. Furthermore, as will later be described, the internal mounting structure which supports the various internal components of the luminaire is the same structure which maintains housing members 16 and 18 in fixed abutting engagement with each other. This mounting structure is entirely enclosed within the the interior of the luminaire and sealed against intrusion of corrosive elements present in the atmosphere of the environment.

A suitable non-metallic molding composition for housing 14 and other non-metallic components of the luminaire 10 is one comprising roughly of up to about 20% by weight of short glass fibers with the remainder comprised of unsaturated polyester resin. Such composition is introduced into a suitable mold and heated to cure the resin and produce a desired fiberglass body.

Figure 2:
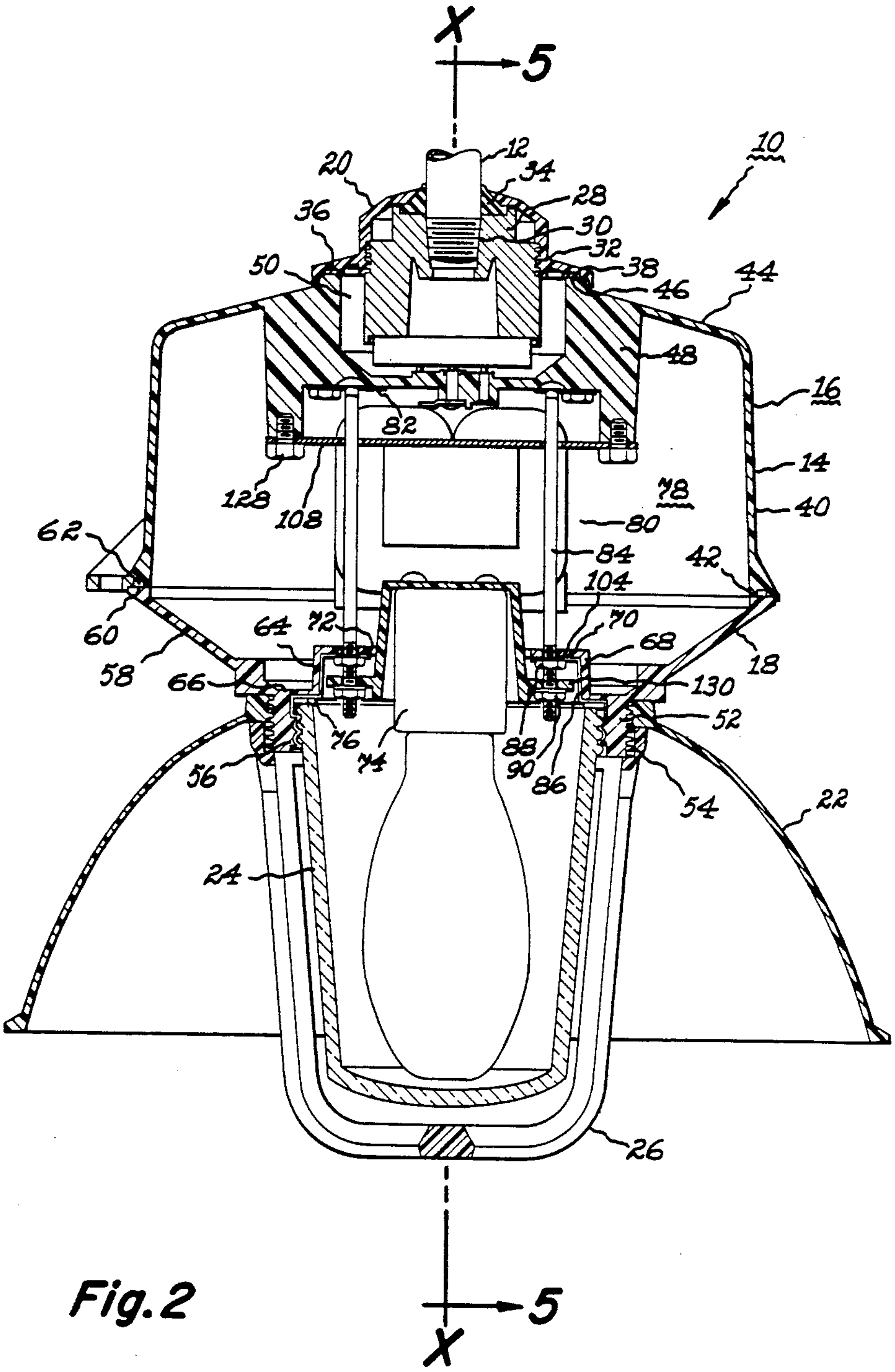
FIG. 2 is a cross-sectional view of the luminaire of FIG. 1 taken along the line 2—2 with some components of the luminaire shown in plane view.

Referring now to FIG. 2, a cross-sectional view of luminaire 10 taken along the line 2—2 of FIG. 1 is presented. Luminaire 10 includes a generally cylindrically configured mounting hub portion 28 having a first internally threaded cylindrical recess wall 30 for threaded engagement with external support 12. The threaded engagement of mounting hub portion 28 with external support 12 provides for the transmission of the entire weight of the luminaire through mounting hub portion 28 to support 12. As will hereinafter be more fully described, mounting hub portion 28 carries a rigid unitary metallic structural support which captures and provides supplemental support for each of certain enumerated electrical and optical components of luminaire 10. The same rigid metallic support structure also provides for primary structural support of components of the luminaire 10.

For purposes of sealing the interior of luminaire 10 from corrosive elements in the atmosphere of the environment, end cap 20 is secured to mounting hub portion 28 through threaded interface 32 disposed between cap 20 and hub portion 28. By screwing end cap 20 onto hub portion 28, a first annular seal 34, surrounding external support 12 and trapped between end cap 20 and mounting hub portion 28, is compressed into sealing engagement with end cap 20, hub portion 28 and external support 12. This sealing engagement provides a liquid and gas tight seal between the end cap 20, external support 12 and mounting hub portion 28. Furthermore, by screwing end cap 20 onto hub portion 28, a second annular seal 36, disposed at an annular joint abutment 38 between end cap 20 and the upper end of first housing member 16, is compressed into sealing engagement with end cap 20 and first housing member 16. This sealing engagement establishes a fluid and gas tight seal between end cap 20 and housing member 16. Thus, seals 34 and 36 entirely seal the upper end of luminaire 10 against the intrusion of corrosive elements. Said another way, sealing means are provided between the luminaire 10 and the external support 12 and between end cap 20, mounting hub 28 and housing member 16 to thereby prevent the intrusion of corrosive elements through the upper end of luminaire 10.

As is readily observed from FIG. 2, upper or first non-metallic housing member 16 of external housing 14 generally is comprised of a hollow cylindrical configuration defined by an axially and circumferentially extending wall 40. Wall 40 terminates at its lower end in an annular circumferentially extending and axially facing abutment surface 42. Housing member 16 further includes a wall 44 integrally joined to wall 40 and extending radially therefrom toward axis x—x. At its radially inner most end, wall 44 includes an axially outwardly facing annular abutment surface 46 which cooperates with seal 36 and end cap 20 to establish the aforementioned gas and fluid tight seal. In addition, wall 44, at its radially innermost end, has an axially inwardly projecting cylindrical mounting and support portion 48 which, in a manner hereinafter to be described, permits housing 16 to be supported on mounting hub portion 28 and which further permits certain of the internal electrical components to be mounted on housing member 16. Mounting and support portion 48 includes an outwardly facing recess 50 for receiving mounting hub portion 28 therein.

External housing member 18 is generally comprised of a hollow cylindrical configuration defined by an axially and circumferentially extending wall 52 at its lower end. Wall 52 of housing member 18 includes a radially outwardly facing and circumferentially extending threaded surface 54 for threaded engagement with reflector 22 and refractor guard 26 whereby reflector 22 and guard 26 are mounted on and supported by wall 52. It is observed that guard 26, when installed on wall 52, prevents removal of reflector 22. Thus, vibration of the luminaire 10 will not result in the inadvertent disassembly of reflector 22 from luminaire 10. Radially inwardly facing and circumferentially extending threaded surface 56 of wall 52 threadably engages refractor 24 whereby refractor 24 is mounted on and supported by wall 52.

Non-metallic housing members 18 further includes a generally radially outwardly and circumferentially extending wall 58 integrally joined at its lower end to wall 52. Wall 58 terminates at its upper end in an annular circumferentially extending axially facing abutment surface 60 which engages abutment surface 42 of housing member 16. Annular seal member 62, disposed at the abutment of surfaces 42 and 60, seals the abutment interface against the intrusion therethrough of corrosive elements in the atmosphere of the environment. Thus, seal member 62 seals the entire intermediate portion of luminaire 10.

Non-metallic housing member 18 also is comprised of a generally radially inwardly and circumferentially extending wall 64 integrally joined to the upper end of wall 52. As is observed in FIG. 2, wall 64 is stepped and includes a first radially extending portion 66 integrally connected to an axially and circumferentially extending portion 68 which, in turn, is integrally connected to a second radially inwardly and circumferentially extending portion 70. A centrally located aperture 72 is provided in wall portion 70 for receiving the upper end of socket and lamp assembly 74 therein. An annular circumferentially extending seal member 76, disposed between radially extending portion 66 of wall 64 and the upper end of refractor assembly 24 provides a fluid and gas tight seal between housing member 18 and refractor assembly 24. Thus, seal member 76 seals the entire lower end of luminaire 10 against the intrusion of corrosive elements in the atmosphere of the environment. Accordingly, seals 34, 36, 62 and 76 ensure that the entire interior of luminaire 10 is sealed from the atmosphere.

It is observed from FIG. 2 that non-metallic housing members 16 and 18 define a central closed cavity 78 which houses the internal electrical components of the luminaire 10 and the rigid unitary metallic support portion now to be more fully described.

Figure 3:
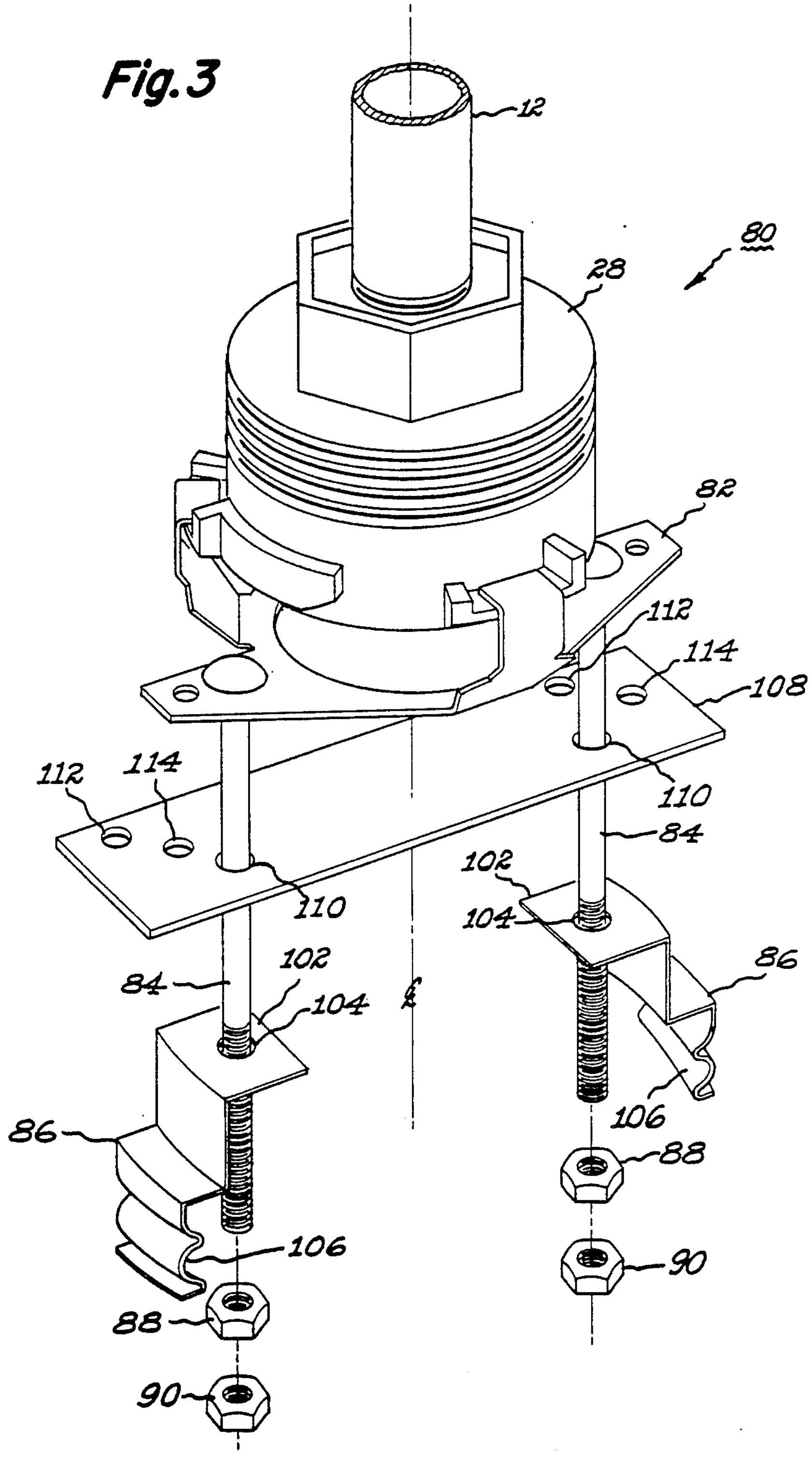
FIG. 3 is an exploded perspective view of the support structure depicted in FIGS. 1 and 2.

Referring to FIG. 3, a rigid unitary metallic support structure or portion, shown in an exploded perspective view generally at 80, is depicted as carried by mounting hub portion 28. More specifically, the rigid support portion 80 is comprised of a metallic plate 82, elongated means in the form of a pair of bolts 84 received and anchored in plate 82, refractor support means in the form of a pair of thread liners 86 and retaining means in the form of first and second pairs of nuts 88 and 90, respectively. Each of the components of support portion 80 are comprised of metallic materials and when installed in luminaire 10 comprise a continuous rigid metallic structure capable of providing primary and supplemental (or back-up) support for the electrical and optical assemblies of the luminaire 10. It is observed that all of the loads transmitted through support portion 80 are transmitted from metal to metal. Flexible means, such as cables may be substituted for bolts 84 provided that when installed in the luminaire in accordance with the teachings of this invention, such cables are in tension and hence rigid.

Referring briefly to FIG. 4, a perspective view of metallic plate 82 is shown. Plate 82 is comprised of a generally transversely extending planar thin base 92 adapted to be positioned perpendicular to the axis x—x of luminaire 10. Base 92 includes a first pair of spaced apart apertures 94, each disposed at opposite ends of base 92 and each receiving one of the bolts 84 therethrough. Plate 82 further includes three hook members 96 extending from base 92 generally in an upward direction parallel to the axis x—x and circumferentially spaced apart from each other by approximately 120°. Each hook member 96 terminates with a radially inwardly projecting arm 98 adapted to engage mounting hub portion 28, in a manner hereinafter described, whereby the weight of rigid unified support portion 80 and the weight of components supported thereby will be transmitted to mounting hub portion 28 and thence to external support 12. Base 92 further includes a second pair of apertures 100 for use in securing housing member 16 to metallic plate 80.

Referring again to FIG. 3, it is observed that each thread liner 86 contains a projecting tab 102 having an aperture 104 through which one of the bolts 84 pass. Thus, each threaded liner 86 is captured to, and supported by, bolts 84 of rigid support portion 80. It is further observed that each thread liner 86 includes a circumferentially extending threaded segment 106 adapted to engage complementary threads on refractor 24. Bolts 84 also capture a ballast assembly support bracket 108 by virtue of the passage of bolts 84 through a pair of apertures 110 in bracket 108. Ballast assembly support bracket 108 further includes second pair of apertures 112 for the purpose of mounting the ballast assembly of luminaire 10 to bracket 108 and a third pair of apertures 114 for the purpose of securing mounting bracket 108 to support portion 48 of housing member 16.

Figure 5:
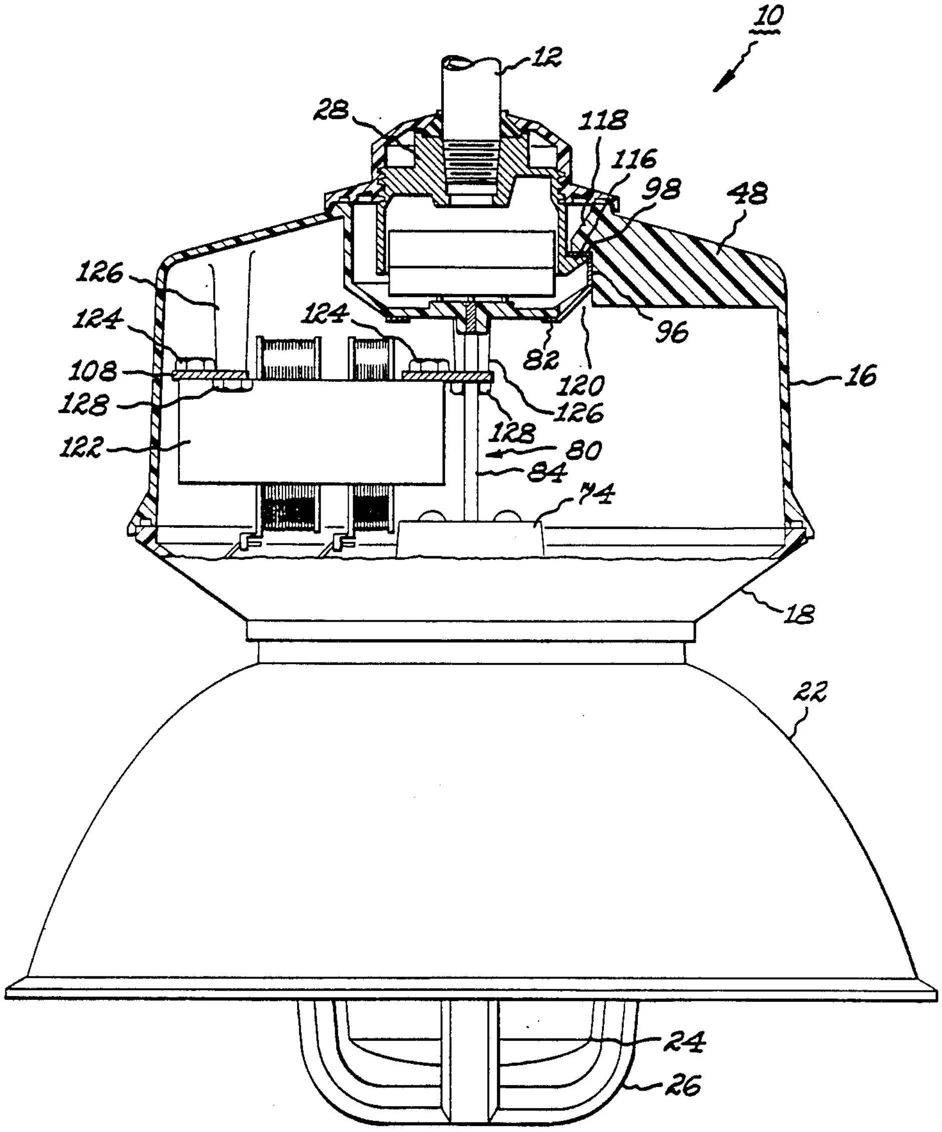
FIG. 5 is a partial cross-sectional view of the luminaires of FIG. 2 taken along the line 5—5.

Referring now to FIG. 5, there is depicted a cross-sectional view of luminaire 10 taken along the line 5—5 of FIG. 2. Mounting hub portion 28 is provided with three radially outwardly projecting ledges 116 (only one of which is shown) equally spaced 120° apart from each other about axis x—x. Each ledge 116 engages one of the inwardly projecting arms 98 extending from hook member 96 of plate 82 of rigid unified support portion 80. For the purpose of permitting such engagement, portion 48 of housing 16 is provided with three passages 120 (only one of which is shown) each permitting hook member 96 to pass therethrough and into engagement with ledges 116. In this manner, the entire weight of the support portion 80 is supported by ledges 116 of mounting hub portion 28 along with the weight of those portions of luminaire 10 supported by support portion 80.

It is also observed from FIG. 5, that portion 48 of housing member 16 is provided with three radially inwardly extending projections 118 which radially overlap arms 98 and ledges 116 and through engagement therewith ensure that the weight of housing member 16 is supported by and transmitted to mounting hub portion 28 and thence to external support 12.

Ballast assembly 122 of luminaire 10, is fixedly secured to ballast assembly mounting bracket 108 by bolts 124. Ballast assembly bracket 108 is, in turn, fixedly secured to bosses 126 depending from housing member 16 by bolts 128. Thus, ballast assembly 122 is fixedly secured to housing member 16 and thus is secured against relative movement with respect to mounting hub portion 28 of luminaire 10. Should the bosses 126, to which ballast assembly 122 is secured, fail during the life of the luminaire, ballast assembly 122 will still be retained to the mounting hub portion 28 since, as previously described, mounting bracket 108 is captured by bolts 84 of rigid unified support structure 80 which, in turn, is secured to mounting hub portion 28. Thus, rigid unified metallic support portion 80 provides supplemental support for ballast assembly 122.

Referring again to FIG. 2, the cooperation of rigid metallic support portion 80 with the other components of luminaire 10 will now be described. Support portion 80 carried by mounting hub portion 28 extends from mounting hub portion 28 through cavity 78 to the lamp and socket assembly 74 disposed at the lower end of housing 14. More specifically, bolts 84 extend from plate 82 through cavity 78, thence through the second radially inwardly extending portion of 70 of housing member 18, thence through apertures 104 of threaded liner 86, and thence through nuts 88. Tightening of nuts 88 on bolts 84 fixedly secures housing member 18 to rigid support structure 80 and forces housing member 18 upwardly (as viewed in FIG. 2) and into abutting engagement with housing member 16 through their respective abutment surfaces 60 and 42. Thus, the two halves of housing 14, namely housing members 16 and 18, are retained in abutting engagement by the rigid support structure 80. It is observed that support structure 80 is disposed in the interior of the luminaire and sealed from contact with corrosive elements in the atmosphere of the external environment.

Threaded bolts 84 also extend through flanges 130 of socket and lamp assembly 74 and thence through nuts 90. Tightening of nuts 90 on bolts 84 effects mounting of socket and lamp assembly 74 on rigid support portion 80 and provides for primary support of socket and lamp assembly 74 by rigid support portion 80. In other words, the entire weight of socket and lamp assembly 74 is transmitted directly to rigid support portion 80.

Referring now to FIG. 6, an enlarged view is shown of a portion of the lower end of luminaire depicted in FIG. 2. As earlier stated, tightening of nuts 88 secures projecting tabs 102 of threaded liners 86 to rigid support structure 80. Thus positioned, the threaded segments 106 conform to the threaded surface 56 of wall 52 of housing member 18. When refractor assembly 24 is threaded into the lower end of luminaire 10, refractor assembly 24 not only engages the threaded surface 56 of housing member 18 but also engages the metallic threaded segments 106 of threaded liners 86. Since refractor 24 engages threaded surface 56 over a greater circumferential distance than the limited distance of engagement with segments 106, refractor 24 receives primary support from housing 18 and supplemental support or retention from threaded liners 86 of rigid metallic support structure 80. Thus, should the non-metallic threaded surface 56 fail during the life of the luminaire 10, the metallic liners 86 will provide supplementary (or back-up) support for refractor 24.

It is readily observed from the foregoing that the present invention provides a rigid unitary metallic support structure 80 which is carried by mounting means 28. Support structure 80 captures the ballast assembly 122, the lower housing member 18, the lamp and socket assembly 74 and the refractor assembly 24. The support structure 80 further provides primary support at least for the lamp and socket assembly 74 and the non-metallic housing member 18 each of which are mounted thereon. The support structure 80 further provides supplemental support for the ballast assembly 122 and the refractor assembly 24. Thus, a single rigid unitary metallic support structure provides for both primary and supplemental support of the electrical and optical components of the luminaire. Thus, separate primary and supplemental support structures are not necessary in the luminaire comprising the present invention.

Additionally, as previously set forth, the rigid unitary support structure 80 captures and provides primary support for lower housing member 18 and maintains housing members 16 and 18 in abutting engagement. Accordingly, external hinges or latches are not needed in the present invention and the disadvantages associated with prior art devices are avoided.

While the preferred embodiment of the present invention has been described and depicted, it will be appreciated by those skilled in the art that modifications, substitutions and changes may be made thereto without departing from the scope of the invention as set forth in the appending claims.

I claim:.

1. A luminaire comprising;

a metallic mounting hub portion adapted to be secured to an external support and carrying a rigid, unitary metallic, structural support portion extending into a cavity of the luminaire;

said cavity being defined by a hollow external housing comprised of a non-metallic material having good resistance to weathering, said housing being secured to said extending rigid metallic support portion;

a ballast assembly residing in said cavity and secured to said extending rigid metallic support portion;

a socket and lamp assembly extending from one side of said cavity and secured to said extending rigid metallic support portion;

said metallic mounting hub and said extending rigid metallic support portion bearing the weight of said housing, said ballast assembly and said socket and lamp assembly, said weight being transmitted through said mounting hub to said external support.

2. The invention as set forth in claim 1, wherein one of said assemblies is mounted on said housing and said rigid metallic support portion provides supplemental retention of one of said assemblies to said mounting hub.

3. The invention as set forth in claim 2 wherein the other of said assemblies is mounted on said rigid metallic support portion and said rigid metallic support portion also provides primary support for said other of said assemblies.

4. The invention as set forth in claim 1 further comprising:

a refractor assembly surrounding said lamp and socket assembly and fixedly secured with respect to said mounting hub portion, said rigid metallic support portion capturing said refractor assembly and providing at least supplemental retention of said refractor assembly.

5. The invention as set forth in claim 1 wherein said housing is comprised of first and second housing members defining said cavity, said first member in abutting engagement with said second member.

6. The invention as set forth in claim 5 wherein said second housing member is mounted on said rigid metallic support portion and retained thereby in said abutting engagement with said first housing member.

7. The invention as set forth in claim 6 wherein said rigid metallic support portion is entirely sealed from the atmosphere external to the luminaire.

8. The invention as set forth in claim 6 wherein;

said rigid metallic support portion has extending members with adjustable means for engaging and bringing said second housing member into said abutting engagement with said first housing member.

9. The invention as set forth in claim 1 wherein;

said rigid metallic support portion extends along the center-line of said external housing, said rigid metallic support portion having platform members secured to said housing and said ballast assembly, said rigid metallic support portion having members extending from said platform members into said cavity and secured to said socket and lamp assembly.

10. A luminaire comprising:

a rigid metallic support structure axially extending and adapted to be secured to an external support, a hollow external housing comprised of a plastic material having good resistance to weathering and corrosion, said housing being further comprised of first and second housing members defining a cavity therewith and through which said rigid metallic structure extends, said first housing member having axially inwardly projecting cylindrical portions support by and fixedly secured to said support structure, said second housing member having inwardly projecting portions supported by and fixedly secured to said support structure at a second end thereof, said support structure retaining said first and second members in abutting engagement.

11. The invention as set forth in claim 10 wherein said support structure resides entirely in an interior of the luminaire sealed entirely against the intrusion of corrosive elements present in the atmosphere of the environment external to the luminaire.

12. The invention of claim 1 further comprising:

a ballast assembly mounted to said housing and captured by said rigid metallic support structure, said ballast assembly residing in said cavity; and a socket and lamp assembly extending from said cavity and fixedly secured to and captured by said support structure.

13. The invention as set forth in claim 12 further comprising:

a refractor assembly mounted on and primarily supported by said housing, said refractor assembly captured by said support structure and supplementally retained thereby.

14. The invention as set forth in claim 10 wherein;

said rigid metallic support structure has extending members with adjustable means for engaging and bringing said second housing member into said abutting engagement with said first housing member..

* * * * *